May 5, 1953

R. D. ACTON 2,637,259

TRACTOR POWER LIFT WITH ROCK-SHAFT AND
SYNCHRONIZED REMOTE CYLINDER

Filed April 23, 1948

Inventor:
Russel D. Acton

Inventor
Russel D. Acton

Patented May 5, 1953

2,637,259

UNITED STATES PATENT OFFICE 2,637,259

TRACTOR POWER LIFT WITH ROCK-SHAFT AND SYNCHRONIZED REMOTE CYLINDER

Russel D. Acton, Chicago, Ill.

Application April 23, 1948, Serial No. 22,826

31 Claims. (Cl. 97—46.27)

This invention relates to an hydraulic power device for tractors and implements. More specifically it relates to an hydraulic power lift arrangement having fluid pressure means on a tractor with a preselective control means and a remote synchronized power cylinder particularly adapted for use with trail-behind implements.

In the operation of tractor connected implements, it is particularly desirable to provide power operated lifting mechanism operable from the power plant of the tractor. It is also desirable to provide a control means accessible to the operator of the tractor which can be set in any preselected position determining a preselected position for the implement. This is particularly desirable for trail-behind implements where the operator cannot watch the implement without taking his attention from the steering and operation of the tractor.

During recent years mechanical and hydraulic power lift systems have been developed which operate rock shafts on the tractor for lifting and adjusting implements directly mounted on the tractor. Such systems have been very satisfactory as a great many implements can be connected by simple linkage to a single permanently fixed rock shaft by simple and inexpensive linkage. As a further modification of this system, auxiliary rock shafts have been spaced on the tractor longitudinally of the built-in power actuated rock shaft thereby providing lifting power from the tractor power lift at spaced locations along the tractor. To facilitate the operation of such lifting devices means have been worked out as disclosed and claimed in Reissue Patent No. 22,932, by means of which a control readily accessible to the operator can be utilized to preselect a position of the rock shaft by selecting a corresponding position on a control lever. Such mechanisms have been termed "touch control," "follow-up," "preselected," and "indexing" types of controls. Such controls are very significant in the operation of tractor mounted equipment as the steering and manipulation of the other controls on the tractor, such as the clutch, brake, and throttle, require most of the operator's attention and he is not able to hold a conventional fluid control valve and watch the movement of the implement to determine the desired operating or lifted position of the implement.

The devices as above set forth have solved the problem of tractor mounted tools where they are directly connected to and supported by the tractor in a satisfactory manner. However, there are a great many implements flexibly connected to the tractor in trail behind position or alongside the tractor which have supporting means independent of the tractor requiring adjustment to determine the working position of the implement or a part thereof. Various means have been devised which transmit power from the tractor or power lift device mounted thereon through flexible means to a flexibly connected implement having its own supporting means. Such devices take various forms such as mechanical linkage, cables, and other structures which must go through the hitch point of the implement to be reasonably accurate and which involve complicated connecting and disconnecting means. A principal object of the present invention is to provide for a tractor connected implement and in combination with the tractor and implement a preselected indexing type of power lift structure on the tractor and a simplified power transmitting means for delivering the same preselective and indexing power to an adjustable part on an implement.

Another principal object is to provide an hydraulic power cylinder remotely located from a tractor on an implement flexibly connected to the tractor and to provide through two flexible fluid conducting lines means for transmitting selective indexing movement from the tractor to the hydraulic device on the implement.

Another object is to convert an hydraulic power device on a tractor for operating a remotely located hydraulic cylinder with selected indexing control. Another specific object is to convert a tractor mounted hydraulic power device having a built-in rock shaft to a system in which a remotely located hydraulic cylinder can be selectively positioned by the same control mechanism utilized on the tractor power lift by merely plugging in two fluid conduits leading to the remote cylinder. Another object is to provide a structure in which a power actuated rock shaft on a tractor and a remotely located power cylinder are controlled in synchronization with selected indexing operation by a single valve control mechanism on the tractor. Another specific object is to provide a tractor mounted power lift mechanism with power supply means on the tractor with means for transmitting synchronized power to a remotely located cylinder and with valve means to cut out the remotely located cylinder and continue operation of the tractor mounted power device.

Another object of the invention is to provide a tractor power device with a follow-up indexing mechanism which has a mechanical connection between the control lever and the power output element whereby synchronization is positively attained at all times, and to provide a remote power cylinder which is synchronized by metering liquid from the tractor cylinder to the remote cylinder, said remote cylinder being provided with a valve mechanism by means of which out-of-phase relationship brought about by leakage is automatically corrected by moving the remote power device to the ends of its stroke.

Another object is to provide for a tractor mounted power lift device having two independent power devices with two independent preselecting control levers with a connection to a single remote fluid pressure device, said connections being formed to provide for metering fluid from both tractor mounted cylinders to the single remote power-lift device whereby a single remote cylinder may be utilized with a metering capacity equivalent to both of the metering volumes of the two cylinders on the tractor.

The above objects and others which will be apparent from the detailed description to follow are accomplished by a construction such as shown in the drawings, in which.

In the modification shown in Figures 1 to 7, inclusive, an implement is shown connected to the tractor for simultaneous use of the permanent rock-shaft on the tractor and the flexibly connected remote power device.

Figure 1:
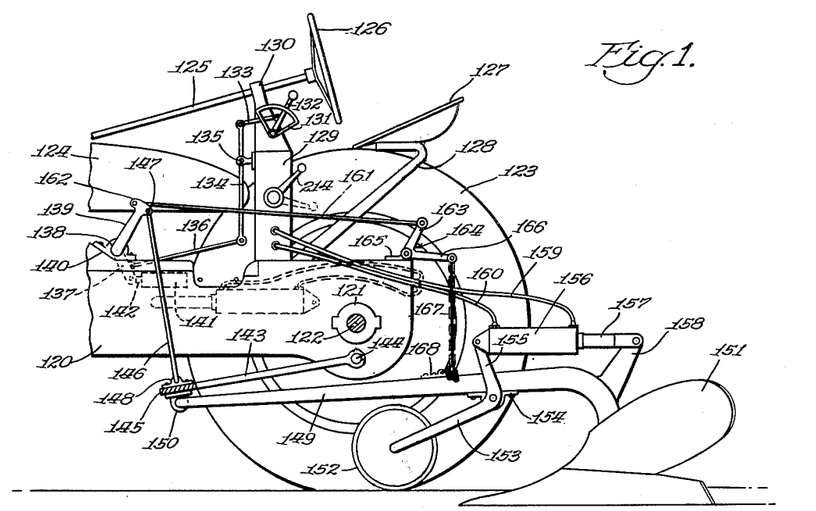
Figure 1 is a side elevation of the rear portion of a tractor with one wheel removed showing an implement flexibly connected to a tractor and a power lift system incorporating a modification of applicant's invention.

Figure 1 shows a tractor having a longitudinally extending body 120, drive axle housings 121, one of which can be seen, and drive axles 122, one of which is shown in section in Figure 1. Traction wheels 123, one of which is removed to better show the implement and power lift structure, are carried on the axles 122. A portion of a hood and fuel tank structure 124 is shown as well as a steering column 125 and a steering wheel 126. An operator's seat 127 mounted on a support 128 provides an operator's station at the rear of the tractor and adjacent the steering wheel 126.

Figure 2:
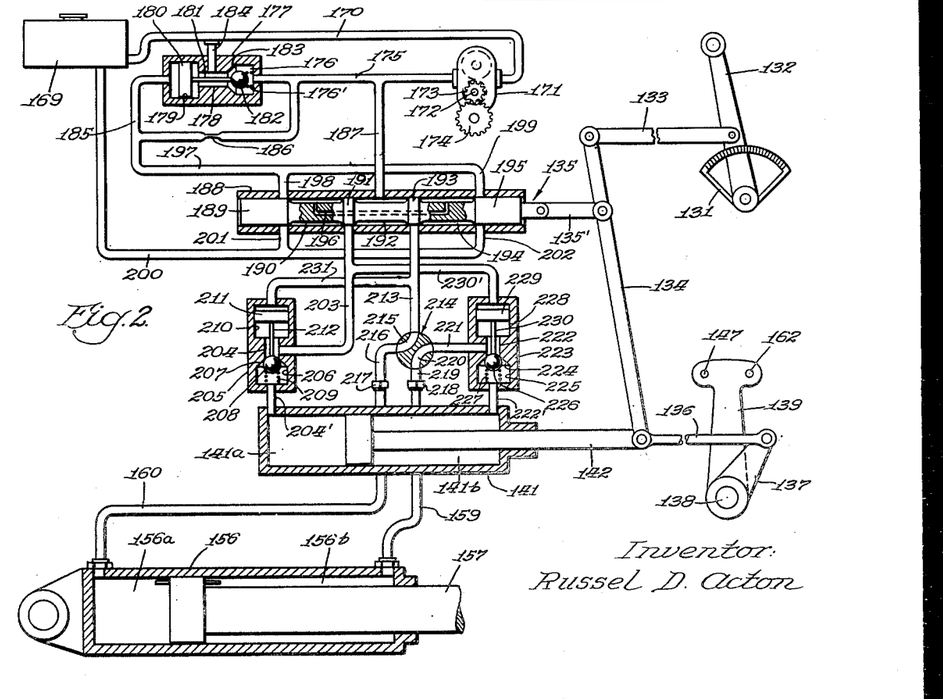
Figure 2 is a diagrammatic view of the hydraulic system utilized in Figure 1, certain corresponding parts such as the rock-shaft and the control lever and linkage having the same reference characters as in Figure 1.

A housing 129 mounted at the rear of the tractor forwardly of the steering wheel 126 contains the power lift valve control structure and reservoir, such parts being shown diagrammatically in Figure 2 along with all elements of the hydraulic power system. A supporting structure 130 on the housing 129 carries the steering column 126.

A quadrant 131 mounted on the structure 130 provides a support for a control lever 132 which is pivotally mounted on the quadrant for arcuate movement thereacross. A link 133 is pivotally connected to the lever 132 and to a vertically extending link 134. Said link 134 is what is ordinarily termed a floating link, being pivotally connected by a link 135' to a valve member 135 at a midpoint and being pivotally connected at the end opposite the link 133 to a link 136. Said link, as indicated in dotted lines, is pivotally connected to an arm 137 carried for movement with a rock-shaft 138. Said rock-shaft has a lifting arm 139. It will be noted that the rock-shaft is fixed permanently on the tractor by means of an attaching bracket 140.

An expansible hydraulic power device in the form of a cylinder 141 and a piston 142 is shown in dotted lines within the body portion 120 of the tractor, said piston being pivotally connected to the arm 137 whereby said piston and cylinder device operates the rock-shaft 138 and the lifting arm 139. As previously stated, the entire power lift mechanism, which is mostly concealed in Figure 1, is shown completely in diagrammatic form in Figure 2.

A reversed or forwardly extending draw-bar 143 is shown as being pivotally connected by pins 144, one of which is visible in Figure 1. Said draw-bar has a transverse forward portion 145 which is shown in section as a portion has been removed with the traction wheel at the near side of the structure to better show the implement and power lift construction. A lifting link 146 is pivotally connected at 147 to the lifting arm 139 of the rock-shaft and pivotally connected to a bracket 148 mounted on the transverse forward portion of the draw-bar 143. An implement structure in the form of a plow beam 149 is pivotally connected at its forward end to a bracket 150 also secured to the transverse portion 145 of the draw-bar.

Said plow beam as illustrated carries a moldboard plow 151 illustrated as being in working position in the soil. A gauge wheel 152 for regulating the working depth of the plow 151 is shown ahead of the plow operating on the unbroken soil. Said gauge wheel is carried on a bell-crank member 153 pivotally supported intermediate its ends on a bracket 154 secured to the plow beam 149. An upwardly extending arm 155 of the bell-crank member is pivotally connected to one end of an expansible fluid pressure device. Said device has two elements one being a cylinder 156 connected to the arm 155 and another being an element in the form of a piston member 157 pivotally connected to an upstanding bracket 158 secured at a rearward location to the plow beam 114. The fluid pressure device is a two-way operating structure having fluid conduit means in the form of flexible hoses 159 and 160. Said lines are connected to the housing 129 and within said housing to other fluid conduits as illustrated in Figure 2.

A longitudinally extending link 161 is pivotally connected at 162 to the power lift arm 139 and to an upwardly extending arm 163 which is a part of a rockable structure designated in its entirety by the reference character 164 mounted for oscillation on a transverse axis at the rear of the tractor. A bracket 165 is shown as a mounting means for said rockable structure. Said structure also carries a rearwardly extending arm 166 to which lifting means in the form of a chain 167 is secured. Said chain is also secured to a bracket 168 fixed to the plow beam 149.

The diagrammatic views of Figures 3 to 7, inclusive, have several elements corresponding to those described in Figure 1 and the parts have been correspondingly numbered including the valve 135, the piston 142, the cylinder 141, the remote piston 157, and the remote cylinder 156. The fluid lines 159 and 160 also bear the same reference characters as well as the actuating lever 132, the links 133 and 134, the rock-shaft 138, the lifting arm 139, the connecting points 147 and 162, and the arm 137 on the rock-shaft. So that corresponding parts on the structures can be readily followed, it will be noted that an additional link 135' appears in the diagrammatic views as connecting the link 134 and the valve 135. Also an additional link 136 connects the lever arm 137 with the piston 142 instead of a direct connection as illustrated in Figure 1.

Figure 3:
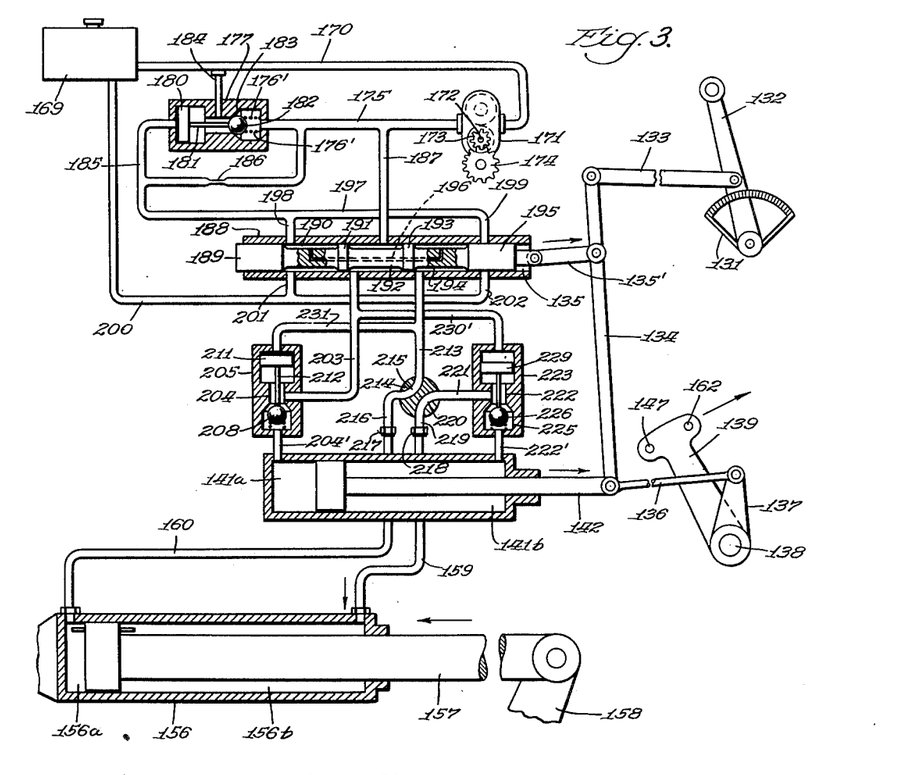
Figure 3 shows the same diagrammatic structure as Figure 2 with the control valves in a position to move the rock-shaft in the direction indicated by the arrow and to simultaneously move the piston of the remotely located cylinder in the direction indicated by the arrow.
Figures 5, 6, 7:
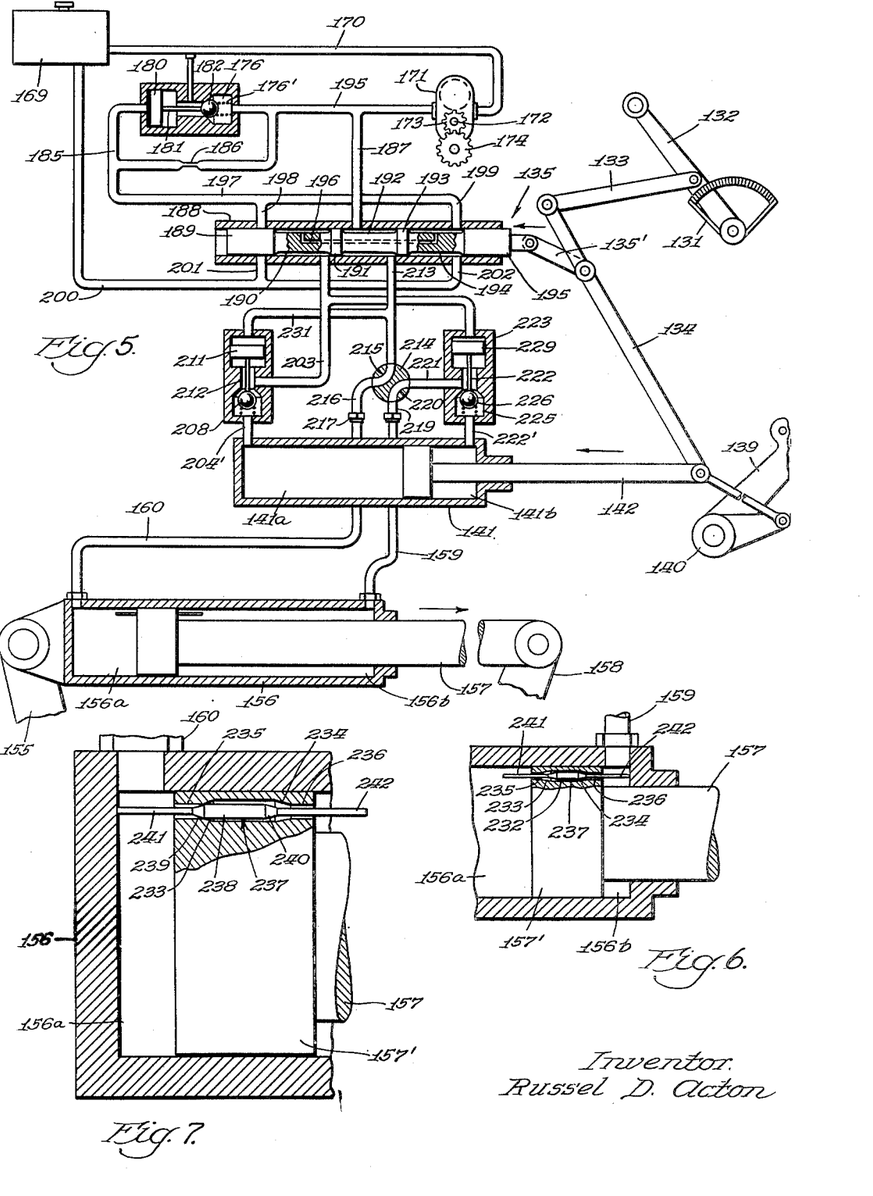
Figure 5 shows the same structure of Figure 2 with the control lever in a position to move the rock-shaft in a direction opposite to the direction of movement in Figure 4 and to move the piston in the opposite direction, the direction of movement being indicated by arrows in Figure 5.
Figure 6 is an enlarged detail showing the rephasing valve operating at one end of the stroke of the remote piston.
Figure 7 shows the piston at the other end of its stroke with the rephasing valve in position to open upon further movement of the piston.

In Figures 2, 3, and 5 a liquid reservoir 169 is connected by a fluid conduit 170 with a fluid pressure pump 171. Said pump is illustrated as of the meshing gear type being driven by a projecting shaft 172 carrying a gear 173, engagement with a gear 174 forming a part of the power plant of the tractor, for example, the usual gear for driving the cam shaft. It is to be understood that the gear 174 may be driven from any portion of the power plant of the tractor.

A discharge conduit 175 from the pump 171 communicates with a chamber 176 formed in a valve housing 177. Said chamber communicates through a bore 178 with a piston chamber 179 in which a piston 180 is mounted for limited reciprocation. Said piston carries a push rod 181 adapted to pass through the bore 178 and constructed to engage a ball valve 182 spring-pressed against a seat 183 formed between the bore 178 and the chamber 176. A by-pass conduit 184 connects the bore 178 with the low pressure fluid supply conduit 170.

A conduit 185 connects the chamber 179 at the side of the piston opposite the push rod 181 with the discharge conduit 175 from the pump. A restriction 186 is formed in said conduit to continually bleed from the discharge side of the pump a very small volume of liquid when the pump is operating at high pressure.

A conduit 187 connects the discharge conduit 175 from the pump with a central point of a control valve housing 188. Said housing together with the valve 135, which is of the reciprocating piston type forms the follow-up control valve for the power lift mechanism. The valve 135 consists of a piston portion 189, an annular recess portion 190, a piston portion 191, an annular recess portion 192, a piston portion 193, an annular recess portion 194, and a piston portion 195. The recess portion 190 is put into fluid communication with the recess portion 194 by an axially extending conduit 196 formed in the valve body.

A conduit 197 is connected by two branches 198 and 199 with the valve housing 188 at points spaced laterally a substantial distance at opposite sides of the communication of the supply conduit 187 with the valve housing 188. A by-pass conduit 200 communicating with the reservoir 169 communicates through a branch conduit 201 with the valve housing at a point in alinement with the branch conduit 198 and through a branch conduit 202 with the valve housing at a point diametrically in alinement with the branch conduit 199.

A conduit 203 communicates with the valve housing 188 and with a bore 204 formed in a valve housing 205. Said bore communicates with a valve chamber 206, a valve seat 207 being formed around the bore 204 at its junction with the chamber 206. A ball valve 208 engageable with said seat 207 is spring-pressed thereagainst by a compression spring 209. The bore 207 communicates at its upper end with a piston chamber 210 in which a piston 211 is mounted for limited reciprocation. Said piston carries a push rod 212 engageable with the ball valve 208 for opening said valve upon the movement of the piston in a downward direction.

A conduit 213 communicating with the valve housing 188 as shown in Figure 2 is put into communication by a valve 214 having a passage 215 therein with a conduit 216. Said conduit is connectable by a fitting 217 with the conduit 160 leading to remote cylinder 156. The conduit 159 is connected by a fitting 218 with a conduit 219 which as shown in Figure 2 is put into communication by a conduit 220 in the valve 214 with a conduit 221. Said conduit communicates with a bore 222 formed in a valve housing 223. Said bore is joined by a valve seat 224 with a valve compartment 225. A ball valve 226 urged against the seat 224 by a spring 227 normally seals the bore 222.

At its upper end the bore 222 communicates with a piston chamber 228 in which a piston 229 is mounted for limited reciprocation. Said piston carries a push rod 230 engageable upon downward movement of the piston 229 to unseat the ball valve 226. Above the piston 229 the chamber 228 communicates with a conduit 230' which in turn communicates with the conduit 203. A symmetrical conduit 231 communicates with the chamber 210 above the piston 211 and with the conduit 213.

Referring particularly to Figures 6 and 7, the remote piston 157 has an enlarged head portion 157' in which a bore 232 is formed. Said bore has a valve seat 233 at one end of the bore and a valve seat 234 at the other end of the bore. A small diameter outer bore 235 forms a communication between the seat 233 and one side of the piston head. A small bore 236 forms a communication between the valve seat 234 and the other end of the piston head 157'. A valve designated in its entirety by the reference character 237 is mounted for free reciprocation in the bore 232. Said valve has a central body portion 238 smaller in diameter than the bore 232 and of less length than said bore. A valve seat 239 is formed at one end of the central portion 238 and a valve seat 240 is formed at the other end of said central portion. A valve stem 241 projects from the valve at one end thereof beyond the valve seat 239 through the bore 235. A valve stem 242 formed as an integral part of the valve projects from the valve seat 240 through the bore 236 at the other end.

With the valve 135 in the position shown in Figures 2, 3, and 5, the operation of the device will be explained. In Figure 2 the piston portion 189 is in a position to close the branch conduits 198 and 201. The piston portion 195 of the valve 135 is in a position to close the branch conduits 199 and 202. The piston portions 191 and 193 of the valve 135 are respectively in positions to close the conduits 203 and 213. With this condition, which is a neutral position for the valve 135, fluid being discharged from the continually operating pump 171 builds up a high pressure in the line for which there is no place of delivery when the valve 182 is seated. As previously explained, the restricted portion 186 of the conduit 185 provides for a continual limited discharge of fluid, said discharge rate being obviously accelerated when pressure builds up at the discharge side of the pump in the conduit 175. As soon as the valve 135 is returned to neutral position closing the branch conduits 198 and 199, pressure rapidly builds up in the conduit 185 by reason of the discharge through the conduit 186. Such pressure operates the piston 180 moving it to the right unseating the ball valve 182 and relieving the pump by by-passing fluid discharged therefrom through the conduit 184 to the low pressure side of the system. Once the ball valve 182 has been opened very little pressure is required by the piston 180 to retain it in open position. The resistance to fluid flow in the lines even with the by-pass open is sufficient to maintain the piston 180 in the position shown with the ball valve 182 in the by-pass position illustrated in Figure 2.

It will be understood that with the valve 135 in the position shown in Figure 2 the conduits 203 and 213 are hydraulically locked, thereby locking both the piston 142 and the piston 157 in position against movement in either direction.

When it is desired to move the rock-shaft 138 and simultaneously in synchronization therewith the remote piston 157, the control lever 132 is manually moved by the operator from his station on the tractor to either the position shown in Figure 3 or the position shown in Figure 5. Referring first to Figure 3, the operator moves the control lever 132 over the quadrant 139 to a preselected indexing position on the quadrant and releases the lever, there being sufficient friction or other provision in the detent mechanism of the quadrant to hold the actuating control lever 132 in any selected position. It is only necessary to have sufficient holding force to move the valve 135. As the valve is completely balanced against any forces exerted by liquid pressure, there is very little force required to hold the control lever 132 in any selected position.

With the valve 135 in the position shown in Figure 3 the branch conduits 199 and 202 remain closed while the branch conduits 198 and 201 are open to the recess 190. This communication relieves pressure in the conduit 197 and likewise in the conduit 185, whereby a valve spring 176' forces the ball valve 176 into seated position as shown in Figure 3, the piston 180 moving to the left and carrying with it the push rod 181. Pressure then rapidly builds up in the discharge conduit 175 from the pump and in the conduit 187. As previously stated, the restriction 186 in the conduit 185 permits only a very small percentage of the fluid from the pump to escape even under high pressure.

It will be noted in Figure 3 that the piston portion 191 of the valve 135 has moved to the left to uncover the conduit 203 and to place it in communication with the conduit 187 through the recess 192. Fluid under pressure is therefore delivered to the bore 204, unseating the spring-pressed valve 208, by-passing the valve and passing through a short conduit 204' into the cylinder 141 at the left end of the piston 142. In order to more clearly describe the operation of the hydraulic system, the chamber at this end of the cylinder 141 has been designated at 141a and the chamber at the other side of the piston through which the rod of the piston passes has been designated as 141b.

Pressure being delivered to chamber 141a moves the piston 142 in the direction of the arrow thereby moving the lifting arm 139 in the direction of the arrow in a clockwise direction as viewed in Figure 3.

It will be noted that when liquid is delivered under pressure to conduit 203, it is also delivered with the same pressure to the conduit 230', whereby fluid pressure is exerted against the piston 229 opening the ball valve 226 to the position shown in Figure 3. Because of the opening of this valve, fluid from the chamber 141b is delivered outwardly through a short conduit 222' through the chamber 225, the bore 222, and the conduit 221 to the valve 214. With the valve in the position shown in Figure 3, liquid passes through the conduit 220 in the valve to the conduit 219 and therefrom to the conduit 159 leading to the right end of the remote cylinder 156. To assist in the description the chamber at the piston rod side of said cylinder is designated as 156b, and the chamber to the other or left-hand end is designated as 156a. Fluid being delivered to the chamber 156b moves piston 157 to the left as indicated by the arrow, thereby forcing fluid out through the chamber 156a through the conduit 160 through the short conduit 216 through the conduit 215 in the valve 214 through the conduit 213 to the recess 194. From said recess fluid passes through the conduit 196 in the piston to the recess 190 and therefrom out through the branch conduit 201 to the conduit 200 leading back to the reservoir 169.

As the piston 142 moves to the right, the lower end of the link 134 is likewise moved to the right, and as the pivotal connection of the link 134 with the link 133 is a fixed fulcrum with any preset position of the control lever, the valve 135 is moved to the right as indicated by the arrow. Movement of the tractor-mounted piston and the rock-shaft to which it is connected and synchronous movement of the remote piston continue until the valve 135 returns to the position shown in Figure 2, in which position the valve 182 is opened by functioning of the system as previously described and fluid is hydraulically locked in the conduits leading to the power cylinders. It will be understood that the extent of movement of the lifting arm 139 on the tractor rock-shaft and the synchronous movement of the remote piston will depend entirely upon the preset positioning of the control lever 132. By means of index marks on the quadrant 131 or by any other indicating means, the operator knows that for any positioning he sets the control lever 132 the rock-shaft and the remote cylinder will move a corresponding distance and be automatically locked in the new pre-selected or indexed position. As to the control valve construction 135, it is bilaterally symmetrical as regards the positions to either side of neutral. However, as the remote cylinder is not truly symmetrical as to operation in either direction, Figure 5 shows operation in the other direction with the valve 135 moved to the right from its neutral position as shown in Figure 2. The operation of the pressure build-up device including seating of the valve 182 is identical with operation in the other direction, in this case the piston portion 195 putting the branch conduits 199 and 202 in communication to cause closing of the by-pass valve 182.

Fluid under pressure is then delivered to the conduit 213 and therefrom through the conduit 215 in the valve 214 through the conduit 216 and the conduit 160 to the chamber 156ª, thereby forcing the piston 157 to the right in the direction of the arrow. Fluid from the chamber 156ᵇ is thereby forced out through the conduit 159 through the conduit 219 through the conduit 220, the conduit 221, the bore 222, and the short conduit 222′ to the chamber 140ᵇ of the tractor-mounted cylinder 141. The piston 142 is then moved to the left in the direction of the arrow carrying with it the tractor-mounted rock-shaft 138 and the lifting arm 139. Fluid from the chamber 141ª passes out through the short conduit 204′ past the valve 208 which is opened due to pressure in the conduit 231, through the conduit 203 into the recess 199, through the conduit 198 into the recess 194, and therefrom through the conduits 202 and 200 back to the reservoir 169. As the piston rod 142 and the rock-shaft on the tractor move, motion is transmitted to the lower end of the link 134 as shown in Figure 5.

The upper end of link 134 being provided with a fixed fulcrum on the link 133 for any pre-set position of the control lever 132, movement of the lower end of the link 134 in the direction of the arrow moves the valve 135 in the same direction as indicated by the arrow to the left. This action continues with synchronous movement of the tractor-mounted piston 142 and the remote piston 157 until the valve is brought back to the neutral position of Figure 2.

Referring back to Figure 1, with an explanation of the synchronous functioning of the rockshaft 138 with its lifting arm 139 and the remote piston 157, an explanation can be given of the functioning of the two point adjustment structure of Figure 1. With a moldboard plow as illustrated it is essential to adjust the plow with somewhat of a parallel movement. If only the gauge wheel 153 were relied upon the plow would not be in proper plowing position and would tend to run in or out depending upon the tilt with respect to its position of proper balanced relationship with respect to the ground surface. It is therefore desirable to adjust the hitch point of the plow beam 149 simultaneously with the adjustment of the gauge wheel 152. This is accomplished with a power lift system as illustrated by connecting the forward hitch point of the plow with the swinging draw-bar 143 through the link 146 with the power lift arm 139. At the same time the synchronized remote cylinder power lift unit is connected between the adjusting arm 155 for the gauge wheel 152 and the bracket 158 on the plow beam. By proper proportioning of the lever arms on the bell-crank member 153 the proper synchronized adjustment is obtained between the hitch point of the plow beam 149 on the swinging draw-bar and the relative position of the gauge wheel. This is a very significant achievement in obtaining the proper adjustment of a tractor-connected implement having its own gauge means, while permitting the desired flexibility between the tractor and the implement.

As a further structural organization, the additional link 161 as connected from the lifting arm 139 through the bell-crank member 164 and the chain 167 with the plow beam 149, provides means for lifting the entire implement structure free from the ground after the lifting arm 139 has moved in an anti-clockwise direction a sufficient distance to take up the slack in the chain 167. The slack of said chain provides for floating movement of the implement structure on its gauge wheel while serving as a limit stop in case unusually soft soil or a hole is encountered during operation of the implement.

As previously described the cylinder 141 has a chamber 141ᵇ at the piston rod end of the cylinder and a chamber 141ª at the other end. The displacement capacity or volumetric displacement at the piston rod end is equal to the cross sectional area of the bore of the cylinder minus the cross sectional area of the piston rod times the length of the piston stroke. Referring to the remote cylinder 156, it will be noted that the bore of the cylinder is substantially larger than the bore of the cylinder 141 and that the stroke is also substantially longer. More significant is the fact that the cross section of the piston rod 157 is several times that of the piston rod 142. By this construction the displacement capacity or volumetric displacement of the chamber 156ᵇ at the piston side of the remote cylinder 156 which is the cross sectional area of the bore of the cylinder minus the cross sectional area of the piston rod 157 times the length of stroke, is made the same as the volumetric displacement of the chamber 141ᵇ at the piston rod side of the cylinder 141. Said chambers 141ᵇ and 156ᵇ with the conduits 159, 219, 220, and 222′ form a closed secondary circuit through which the same confined liquid passes back and forth between the chambers. As the working phase relationship of the pistons is for one to be at one end of its stroke while the other is at the reverse end of its stroke, fluid displaced from one of said chambers completely fills the other chamber and assures a complete stroke. By thusly providing a closed secondary metering system with chambers of equal displacement capacity in the tractor mounted metering cylinder and the remote indexing cylinder, any desired variation may be provided in the bore and stroke of the remote cylinder and a number of detachable cylinders of different bore and stroke characteristics may be provided and interchangeably utilized. As illustrated, altho the drawing is not to exact scale, the remote cylinder 156ª has over twice the displacement capacity as the chamber 141ª while the chambers 141ᵇ and 156ᵇ are constructed to have the same displacement capacity. This showing illustrates but one embodiment of the possibilities of wide variation in bore and stroke while retaining equal displacement capacities at the metering side of the pistons which form elements of the closed secondary circuit or system.

In the operation of a device as described, it is obvious that after a long length of time or after excessive wear of piston and cylinder parts or packing, there will be some leakage between one side of the piston and the other, that is, between the chambers 141ª and 141ᵇ and out of the chamber 141ᵇ around the piston rod. Also the same thing will occur between the chambers 156ª and 156ᵇ of the cylinder 157. As for the cylinder 141, leakage past the piston and out of the chamber 141ᵇ is not of great significance as the follow-up linkage is mechanically connected to the piston 142 and does not return the valve to neutral position until the piston 142 has moved an amount determined by the indexing position of the control lever 132. However, as leakage occurs between opposite sides of the piston 157 or the piston 142 there will be more or less fluid in the closed secondary circuit between the chambers 141ᵇ and 156ᵇ. Assuming that liquid has leaked out of said closed secondary circuit, referring to the direction of operation shown in Figure 3, there will not be sufficient liquid to move the piston 157 to the full extent of its stroke in the direction shown in Figure 3. Suppose, however, that there is too small an amount of fluid in the secondary circuit, and the operation reversed as shown in Figure 5. In this direction of operation the piston 157 would reach the end of its stroke before sufficient liquid had been discharged from the secondary circuit to return the piston 142 to the full extent of its stroke. In this case a condition would be reached as shown in Figure 6 where the rephasing valve comes into action. As the piston 157 reaches the ends of its stroke and with fluid still being delivered to the chamber 156ᵃ, the valve stem 242 abuts the end of the cylinder 156 unseating the valve 237 which had heretofore been seated by pressure in the chamber 156ᵃ with the seat 240 in sealing relationship with respect to the seat 234. This mechanically opens the valve 237 and permits fluid being delivered to chamber 156ᵃ to pass through the bore 235, the bore 238, and the bore 236 into the chamber 156ᵇ and therefrom back to the chamber 146ᵇ of the cylinder 141 until the piston 142 reaches the end of its stroke thereby bringing the cylinders again into synchronized relationship.

Should the other condition arise in which two much fluid is in the secondary circuit including the chamber 156ᵇ, 141ᵇ, and the connecting conduits, a condition occurs as shown in Figure 7 in which the piston 157 reaches the end of its stroke before the piston 142 reaches the end of its stroke. The valve 237 is then opened in the opposite direction to permit fluid to by-pass from the chamber 156ᵇ to the chamber 156ᵃ until the piston 142 is brought to its end position resulting in synchronizing the two cylinders for subsequent operation. It is therefore evident that the system is self-synchronizing merely by moving the control lever to the full length of its travel in either position. This is a particularly important feature as the two cylinders can never get very far out of synchronization until the operator must move the control lever 132 to an extreme position at which synchronization is again brought about.

Figure 4:
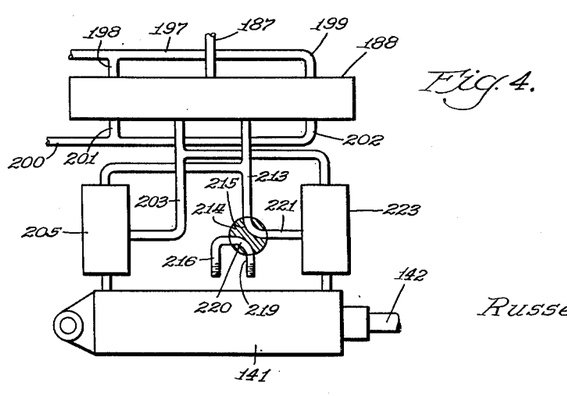
Figure 4 shows the control valve for cutting out the remote cylinder in the cut-out position with the remote cylinder being detached therefrom.

Figure 4 illustrates in a simplified diagram the same structure as Figures 2, 3, and 5 in which the valve 214 is turned 90° to a position putting the conduit 213 into direct communication with the conduit 221. With this position of the valve, the conduit 216 is put into direct communication with the conduit 219 by means of the conduit 220 in the valve. It will be understood that this valve may be thrown out any time by the operator, such valve being illustrated in Figure 1, at which point further movement of the synchronized remote cylinder is stopped and whereafter the operator may use only the tractor-mounted rock-shaft. This is particularly important as for a great many operations it is not necessary to have a flexibly connected remote cylinder. By disconnecting the fittings 217 and 218, the remote cylinder may be removed with the implement or separated therefrom and not used until need has arisen. Also the cylinder may be left on the implement or mounted on the tractor as shown by dotted lines in Figures 1 or disconnected so that it does not operate during the use of the rock-shaft. When the remote cylinder 156 is again connected through the fittings 217 and 218 for functional operation, it is obvious that the touch control lever 132 may be in any one of its indexed positions with the tractor-mounted cylinder 142 in any one of its positions. With a rephasing device as described, it is immaterial where either the piston 142 or the piston 157 is with respect to its cylinder when the attachment is made as said cylinders may be brought into synchronization at once merely by moving the lever 132 into each of its end positions and allowing the valve 135 to be carried back to its neutral position by operation of the rock-shaft 139. The remote cylinder is then in synchronized relationship for operation with the rock-shaft or for operation without the rock-shaft, it being possible to obtain indexing or preselected positioning of the remote cylinder by the metering means provided by the tractor-mounted mechanism.

By a structure as disclosed and explained, applicant has obtained selecting indexing control for a tractor-mounted rock-shaft and has at the same time obtained the same selective indexing control of a flexibly connected remote cylinder for implements flexibly connected to the tractor without the use of any additional mechanism. Means have also been provided for synchronizing the two cylinders and for bringing the remote cylinder into synchronized follow-up relationship with respect to the control lever.

It is understood that applicant claims as his invention all modifications falling within the scope of the appended claims.

What is claimed is:

1. A hydraulic power attachment for tractors comprising a pump adapted to be driven from the power plant of the tractor, a two-way acting cylinder and piston device adapted to be connected to the tractor, valve means for supplying fluid under pressure from said pump to said cylinder at one side of said piston, means connected to said piston for supplying mechanical power for a mechanism mounted on the tractor, a flexible conduit removably connected to said cylinder at the other side of said piston, a second remotely located cylinder and piston device, said conduit being connected to said second cylinder whereby said second cylinder is flexibly mounted, and means selectively operable to provide a fluid communication direct from said other side of said first named piston to the valve means whereby the tractor mounted cylinder and piston device is operable independently of the remote cylinder and piston device.

2. A device as set forth in claim 1 in which a rock-shaft is adapted for being mounted on the tractor and in which the first mentioned cylinder and piston device is connected to the rock-shaft for oscillating the same.

3. A hydraulic power attachment for tractors comprising a pump adapted to be driven from the power plant of the tractor, a cylinder and piston device adapted to be mounted on the tractor, the piston of said device having a piston rod for adjusting purposes, valve means for supplying fluid under pressure from said pump to said cylinder at one side of said piston, a flexible conduit connected to said cylinder at the other side of said piston, an implement adapted to be flexibly connected to the tractor and having an adjustable element thereon, and a second cylinder and piston device mounted on said implement and connected to the adjustable element thereon, said conduit being connected to said second cylinder and means to provide fluid communication between the conduit and the valve means whereby the tractor mounted cylinder and piston device is operable independently of the second named cylinder and piston device.

4. A hydraulic power attachment for tractors comprising a pump adapted to be driven from the power plant of the tractor, a rock-shaft adapted to be on the tractor, a two-way acting cylinder and piston device connected to said rock-shaft, valve means for supplying fluid under pressure in metered amounts from said pump to said cylinder at one side of said piston, a flexible conduit connected to said cylinder at the other side of said piston, an implement flexibly connected to the tractor and having an adjustable element thereon and a second remotely located cylinder and piston device adapted to be mounted on said implement and connected to the adjustable element thereof, said conduit being connected to said second cylinder.

5. A hydraulic power attachment for tractors comprising in combination with a tractor a pump adapted to be driven from the power plant of the tractor, a cylinder and piston device mounted on the tractor, a fluid reservoir and associated valve means mounted on the tractor, fluid conducting means connecting the pump, reservoir and valve means, a conduit means connecting said valve means and one end of the cylinder to provide for flow of fluid under pressure to the cylinder and for return flow from the cylinder, manual control means for said valve means, mechanically actuated follow-up means including motion transmitting means connected to move with said piston and connected to the control means for the valve means, said valve means and control means and the motion transmitting means being so constructed and arranged that any position of the piston is preselectable by said control means thereby providing an indexing control of the piston, a second remotely located two-way acting cylinder and piston device adapted to be mounted on an implement flexibly connected to the tractor, a movable element on said implement, said piston and cylinder device being connected to said element for adjusting the same, a flexible second conduit means connected to the other end of the first named cylinder and to one end of said second cylinder and a third conduit means connected to the other end of said second named cylinder and to the valve means, said valve means having a neutral position and being arranged and constructed when manually shifted to one position in one direction from said position to deliver fluid under pressure from the pump to the one end of the cylinder on the tractor and to another position in the opposite direction from said neutral position to supply fluid under pressure to the other end of the cylinder on the implement, whereby the second named piston follows in synchronization the movements of the first named piston and whereby an indexing control is provided from the tractor for the remote cylinder preselectably to any predetermined position throughout its range of movement by the manual control means on the tractor.

6. A hydraulic power attachment for tractors comprising in combination with a tractor a pump adapted to be driven from the power plant of the tractor, an implement actuating rock-shaft mounted on the tractor, a cylinder and piston device mounted on the tractor and connected to said rock-shaft for oscillation thereof, a fluid reservoir and associated valve means mounted on the tractor, fluid conducting means connecting the pump, reservoir and valve means, a conduit means connecting said valve means and one end of the cylinder to provide for flow of fluid under pressure to the cylinder and for return flow from the cylinder, manual control means for said valve means, mechanically actuated follow-up means including motion transmitting means connected to move with said piston and connected to the control means for the valve means, said valve means and control means and the motion transmitting means being so constructed and arranged that any position of the piston is preselectable by said control means thereby providing an indexing control of the piston, a second remotely located two-way acting cylinder and piston device adapted to be mounted on an implement flexibly connected to the tractor, a movable element on said implement, said piston and cylinder device being connected to said element for adjusting the same, a flexible second conduit means connected to the other end of the first named cylinder and to one end of said second cylinder and a third conduit means connected to the other end of said second named cylinder and to the valve means, said valve means having a neutral position and being arranged and constructed when manually shifted to one position in one direction from said position to deliver fluid under pressure from the tractor and to another position in the opposite direction from said neutral position to supply fluid under pressure to the other end of the cylinder on the implement, whereby the second named piston follows in synchronization the movements of the first named piston and the rock-shaft on the tractor and whereby an indexing control is provided from the tractor for the rock-shaft and the remote cylinder preselectably to any predetermined position throughout its range of movement by the manual control means on the tractor.

7. A device as set forth in claim 5 in which the piston of the remotely located device is provided with valve structure operable to stop fluid flow to the piston by fluid pressure at either side thereof and including means projecting between the opposite sides of the piston and the ends of a cylinder to mechanically open said valve structure for flow of fluid through the piston when said piston reaches the end of its stroke in either direction prior to the piston of the tractor mounted device reaching the end of its structure in the corresponding direction.

8. A device as set forth in claim 5 in which the piston of the remotely located device is provided with a bore therethrough having an enlarged central portion and in which a valve member has a body portion in said central portion of the bore and is formed to abut adjacent the restricted portions at either end of said central portion to form a valve seat, said valve structure being further formed with stems at each end extending beyond both sides of the piston whereby said valve structure is seated by fluid pressure at either side of the piston and is mechanically opened by contact of said stems with the cylinder when the piston of the remote device reaches the end of its structure before the piston of the tractor mounted device reaches the end of its structure in the corresponding movement.

9. A hydraulic power attachment for tractors comprising in combination with a tractor a pump adapted to be driven from the power plant of the tractor, an implement actuating rock-shaft mounted on the tractor, a cylinder and piston device mounted on the tractor and connected to said rock-shaft for oscillation thereof, a fluid reservoir and associated valve means mounted on the tractor, fluid conducting means connecting the pump, reservoir and valve means, a conduit means connecting said valve means and one end of the cylinder to provide for flow of fluid under pressure to the cylinder and for return flow from the cylinder, manual control means for said valve means, mechanically actuated follow-up means including motion transmitting means connected to move with said piston and connected to the control means for the valve means, said valve means and control means and the motion transmitting means being so constructed and arranged that any position of the piston is preselectable by said control means thereby providing an indexing control of the piston, a second remotely located two-way acting cylinder and piston device adapted to be mounted on an implement flexibly connected to the tractor for adjusting an element thereof, a flexible second conduit means connected to the other end of the first named cylinder and to one end of said second cylinder and a third conduit means connected to the other end of said second named cylinder and to the valve means, said valve means having a neutral position and being arranged and constructed when manually shifted to one position in one direction from said position to deliver fluid under pressure from the pump to the one end of the cylinder on the tractor and to another position in the opposite direction from said neutral position to supply fluid under pressure to the other end of the cylinder on the implement, whereby the second named piston follows in synchronization the movements of the first named piston and the rock-shaft on the tractor and whereby an indexing control is provided from the tractor for the rock-shaft and the remote cylinder preselectably to any predetermined position throughout its range of movement by the manual control means on the tractor.

10. In a tractor having a power plant and a fluid pump driven thereby and in combination therewith a hydraulic power attachment comprising a two-way acting cylinder and piston device mounted on the tractor, a rock-shaft on the tractor, the piston of said device being operatively connected to the rock-shaft for oscillating said rock-shaft in either of two directions, a lifting arm on said rock-shaft, an implement connected to said rock-shaft for vertical adjustment thereby, valve structure including a valve movable in two directions from a neutral position, means for supplying fluid under pressure from said pump to said valve structure, means for supplying fluid from said valve structure to one end of said cylinder, conduit means for supplying fluid from said valve to the other end of said cylinder, a valve means interposed in said conduit means, two conduits connected to said valve means, a cylinder and piston device, the cylinder of said device being connected to said conduits and being located on said implement, said implement having a part to be adjusted and said cylinder and piston device being connected to said implement part for adjustment thereof, said valve means being operable to supply fluid direct to the first mentioned cylinder with the conduits to the remote cylinder being blocked out of communication, said valve means being also constructed to be shifted to supply fluid direct from the valve means to one of said conduits and to supply fluid from the other conduit to the tractor-mounted cylinder.

11. For a tractor having a power plant, a pump adapted to be driven from the power plant of the tractor and in combination therewith, a two-way acting cylinder and piston device mounted on the tractor, a rock-shaft on the tractor, the piston of said device being operatively connected to the rock-shaft for oscillating said rock-shaft in either of two directions, a lifting arm on said rock-shaft for connecting implements thereto, valve structure including a valve movable in two directions from a neutral position, means for supplying fluid under pressure from said pump to said valve structure, means for supplying fluid from said valve structure to one end of the cylinder of said cylinder and piston device, conduit means for supplying fluid from said valve to the other end of said cylinder, and in combination a valve means interposed in said conduit means on the tractor, two conduits connected to said valve means, a remotely located cylinder connected by said conduits and adapted to be located on an implement flexibly connected to the tractor and connected to an implement part for adjustment thereof, said valve means being operable to supply fluid direct to the first mentioned cylinder with the conduits to the remote cylinder being blocked out of communication, said valve means being also constructed to be shifted to supply fluid direct from the valve means to one of said conduits and to supply fluid from the other conduit to the tractor-mounted cylinder.

12. In a tractor having a power plant and a fluid pump driven thereby and in combination therewith a hydraulic power attachment comprising a two-way acting cylinder and piston device mounted on the tractor, a rock-shaft on the tractor, the piston of said device being operatively connected to the rock-shaft for oscillating said rock-shaft in either of two directions, a lifting arm on said rock-shaft for connecting implements thereto, valve structure including a valve movable in two directions from a neutral position, means for supplying fluid under pressure from said pump to said valve structure, means for supplying fluid from said valve structure to one end of said cylinder, conduit means for supplying fluid from said valve to the other end of said cylinder, a valve means interposed in said conduit means, two conduits connected to said valve means, a remotely located cylinder and piston device, the cylinder of said cylinder and piston device being connected to said conduits and adapted to be located on an implement flexibly connected to the tractor and connected to an implement part for adjustment thereof, said valve means being operable to supply fluid direct to the first mentioned cylinder with the conduits to the remote cylinder being blocked out of communication, said valve means being also constructed to be shifted to supply fluid direct from the valve means to one of said conduits and to supply fluid from the other conduit to the tractor-mounted cylinder.

13. A hydraulic power attachment for tractors having a power plant comprising: a pump adapted to be driven from the power plant of the tractor, a two-way acting cylinder and piston device adapted to be mounted on the tractor, a rock-shaft adapted to be mounted on the tractor, the piston of said device being operatively connected to the rock-shaft for oscillating said rock-shaft in either of two directions, a lifting arm on said rock-shaft for connecting implements thereto, valve structure including a valve movable in two directions from a neutral position, means for supplying fluid under pressure from said pump to said valve structure, means for supplying fluid from said valve structure to one end of said cylinder, conduit means for supplying fluid from said valve to the other end of said cylinder, valve means interposed in said conduit means, two conduits connected to said valve means, a remotely located piston and cylinder connected by said conduits, one of said conduits being connected to each end of the cylinder, said remotely located piston and cylinder device being adapted to be located on an implement flexibly connected to the tractor and connected to an implement part for adjustment thereof, said valve means being operable to supply fluid direct to the first mentioned cylinder with the conduits to the cylinder which is remotely located being blocked out of communication, said valve means being also constructed to be shifted to supply fluid direct from the valve means to one of said conduits and to supply fluid from the other conduit to the tractor-mounted cylinder.

14. A tractor-mounted implement and a lifting and adjusting device therefor comprising in combination with a tractor having a pump adapted to be driven from the power plant thereof, an implement actuating rock-shaft mounted on the tractor, a soil working implement having a frame structure, a lifting connection between the rock-shaft and the forward end of said structure, a cylinder mounted on the tractor, a piston reciprocable in said cylinder and connected to said rock-shaft for oscillation thereof, a fluid reservoir and associated valve means mounted on the tractor, fluid connections between the pump, the reservoir and the valve means, a conduit connecting said valve means and one end of the cylinder to provide for flow of fluid under pressure to the cylinder and for return flow from the cylinder, manual control means for said valve means, mechanically operated valve actuating means including motion transmitting means connected to move with the piston and the rock-shaft and connected to the manual control means for the valve means, said valve means having a neutral position and being arranged and constructed when manually shifted to one position in one direction from said neutral position to deliver fluid under pressure from the pump to said one end of the cylinder, and to another position in the opposite direction from said neutral position to drain fluid from said end of the piston back to the reservoir, a second cylinder located on the implement structure, said implement structure having an adjustable wheeled support connected thereto at a point spaced from the lifting connection with the rock-shaft, a piston reciprocable in said second cylinder and connected to said support for adjusting the position thereof and thereby the working depth of the implement, a second conduit means connected to the other end of the first named cylinder and to one end of said second cylinder, and a third conduit means connected to the other end of the second named cylinder and to the valve means, said valve means being so arranged and constructed that when fluid is being delivered under pressure to the one end of the cylinder on the tractor fluid is drained from the other end of the cylinder on the implement and when fluid is drained from the other end of the cylinder on the tractor fluid is supplied under pressure to the one end of the cylinder on the implement, whereby the second named piston follows in synchronization the movement of the first named piston and its associated rock-shaft on the tractor, and whereby an indexing control is provided from the tractor for synchronous operation of the rock-shaft, and the wheeled support on the implement preselectable to any predetermined position through their ranges of movement by the manual control means on the tractor and whereby the implement frame structure is moved bodily in a generally vertical direction with a movement of translation.

15. A tractor-mounted implement and a lifting and adjusting device therefor comprising in combination with a tractor having a pump adapted to be driven from the power plant thereof, an implement actuating rock-shaft mounted on the tractor, a vertically movable lifting structure at the rear of the tractor, linkage connecting said structure and said rock-shaft for simultaneous movement thereof, a soil working implement having a frame structure, a lifting connection between the rock-shaft and the forward end of said structure, a flexible lifting connection between the lifting structure at the rear of the tractor and said implement structure, a cylinder mounted on the tractor, a piston reciprocable in said cylinder and connected to said rock-shaft for oscillation thereof, a fluid reservoir and associated valve means mounted on the tractor, fluid connections between the pump, the reservoir and the valve means, a conduit connecting said valve means and one end of the cylinder to provide for flow of fluid under pressure to the cylinder and for return flow from the cylinder, manual control means for said valve means, mechanically operated valve actuating means including motion transmitting means connected to move with the piston and the rock-shaft and connected to the manual control means for the valve means, said valve means having a neutral position and being arranged and constructed when manually shifted to one position in one direction from said neutral position to deliver fluid under pressure from the pump to said one end of the cylinder, and to another position in the opposite direction from said neutral position to drain fluid from said end of the piston back to the reservoir, a second cylinder located on the implement structure, said implement structure having an adjustable wheeled support connected thereto at a point spaced from the lifting connection with the rock-shaft, a piston reciprocable in said second cylinder and connected to said support for adjusting the position thereof and thereby the working depth of the implement, a second conduit means connected to the other end of the first named cylinder and to one end of said second cylinder, and a third conduit means connected to the other end of the second named cylinder and to the valve means, said valve means being so arranged and constructed that when fluid is being delivered under pressure to the one end of the cylinder on the tractor fluid is drained from the other end of the cylinder on the implement and when fluid is drained from the other end of the cylinder on the tractor fluid is supplied under pressure to the one end of the cylinder on the implement, whereby the second named piston follows in synchronization the movement of the first named piston and its associated rock-shaft on the tractor, and whereby an indexing control is provided from the tractor for synchronous operation of the rock-shaft, the lifting structure at the rear of the tractor, and the wheeled support on the implement preselectable to any predetermined position through their ranges of movement by the manual control means on the tractor, said lifting connection from the lifting structure at the rear of the tractor and the wheeled support on the implement having a substantial lost motion whereby the wheeled support is effective throughout a substantial range of movement of the lifting mechanism to determine the working depth of the implement and whereby the other range of movement of the lifting mechanism the implement is lifted completely from the ground with a substantially parallel movement.

16. A tractor-mounted implement and a lifting and adjusting device therefor comprising in combination with a tractor having a pump adapted to be driven from the power plant thereof, an implement actuating rock-shaft mounted on the tractor centrally thereof, a soil working implement having a frame structure lying beneath the tractor, a lifting connection between the rock-shaft and the forward end of said structure, a cylinder mounted on the tractor, a piston reciprocable in said cylinder and connected to said rock-shaft for oscillation thereof, a fluid reservoir and associated valve means mounted on the tractor, fluid connections between the pump, the reservoir and the valve means, a conduit connecting said valve means and one end of the cylinder to provide for flow of fluid under pressure to the cylinder and for return flow from the cylinder, manual control means for said valve means, mechanically operated valve actuating means including motion transmitting means connected to move with the piston and the rock-shaft and connected to the manual control means for the valve means, said valve means having a neutral position and being arranged and constructed when manually shifted to one position in one direction from said neutral position to deliver fluid under pressure from the pump to said one end of the cylinder, and to another position in the opposite direction from said neutral position to drain fluid from said end of the piston back to the reservoir, a second cylinder located on the implement, structure, said implement structure having an adjustable wheeled support connected thereto at a point spaced from the lifting connection with the rock-shaft, a piston reciprocable in said second cylinder and connected to said support for adjusting the position thereof and thereby the working depth of the implement, a second conduit means connected to the other end of the first named cylinder and to one end of said second cylinder, and a third conduit means connected to the other end of the second named cylinder and to the valve means, said valve means being so arranged and constructed that when fluid is being delivered under pressure to the one end of the cylinder on the tractor fluid is drained from the other end of the cylinder on the implement and when fluid is drained from the other end of the cylinder on the tractor fluid is supplied under pressure to the one end of the cylinder on the implement, whereby the second named piston follows in synchronization the movement of the first named piston and its associated rock-shaft on the tractor, and whereby an indexing control is provided from the tractor for synchronous operation of the rock-shaft, and the wheeled support on the implement preselectable to any predetermined position through their ranges of movement by the manual control means on the tractor and whereby the implement frame structure is moved bodily in a generally vertical direction with a movement of translation.

17. A tractor mounted implement and a lifting and adjusting device therefor comprising in combination with a tractor having a pump adapted to be driven from the power plant thereof, an implement actuating rock-shaft mounted on the tractor centrally thereof, a vertically movable lifting structure at the rear of the tractor, linkage connecting said structure and said rock-shaft for simultaneous movement thereof, a soil working implement having a frame structure lying beneath the tractor, a lifting connection between the rock-shaft and the forward end of said structure, a flexible lifting connection between the lifting structure at the rear of the tractor and said implement structure, a cylinder mounted on the tractor, a piston reciprocable in said cylinder and connected to said rock-shaft for oscillation thereof, a fluid reservoir and associated valve means mounted on the tractor, fluid connections between the pump, the reservoir and the valve means, a conduit connecting said valve means and one end of the cylinder to provide for flow of fluid under pressure to the cylinder and for return flow from the cylinder, manual control means for said valve means, mechanically operated valve actuating means including motion transmitting means connected to move with the piston and the rock-shaft and connected to the manual control means for the valve means, said valve means having a neutral position and being arranged and constructed when manually shifted to one position in one direction from said neutral position to deliver fluid under pressure from the pump to said one end of the cylinder, and to another position in the opposite direction from said neutral position to drain fluid from said end of the piston back to the reservoir, a second cylinder located on the implement structure, said implement frame structure having an adjustable frame wheeled support connected thereto at a point spaced from the lifting connection with the rock-shaft, a piston reciprocable in said second cylinder and connected to said support for adjusting the position thereof and thereby the working depth of the implement, a second conduit means connected to the other end of the first named cylinder and to one end of said second cylinder, and a third conduit means connected to the other end of the second named cylinder and to the valve means, said valve means being so arranged and constructed that when fluid is being delivered under pressure to the one end of the cylinder on the tractor fluid is drained from the other end of the cylinder on the implement and when fluid is drained from the other end of the cylinder on the tractor fluid is supplied under pressure to the one end of the cylinder on the implement, whereby the second named piston follows in synchronization the movement of the first named piston and its associated rock-shaft on the tractor, and whereby an indexing control is provided from the tractor for synchronous operation of the rock shaft, the lifting structure at the rear of the tractor, and the wheeled support on the implement preselectable to any predetermined position through their ranges of movement by the manual control means on the tractor, said lifting connection from the lifting structure at the rear of the tractor and the wheeled support on the implement having a substantial lost motion whereby the wheeled support is effective throughout a substantial range of movement of the lifting mechanism to determine the working depth of the implement and whereby the other range of movement of the lifting mechanism the implement is lifted completely from the ground with a substantially parallel movement.

18. A device as set forth in claim 17 in which a fluid flow passage is provided in the piston of the remote cylinder and in which valve means are provided for opening said passage for the flow of fluid in either direction, said valve means including an element projecting from each side of the piston and engageable with the cylinder when the piston reaches the end of its stroke.

19. A device as set forth in claim 17 in which the piston of the remotely located device is provided with valve structure operable to stop fluid flow to the piston by fluid pressure at either side thereof and including means projecting between the opposite sides of the piston and the ends of a cylinder to mechanically open said valve structure for flow of fluid through the piston when said piston reaches the end of its stroke in either direction prior to the piston of the tractor mounted device reaching the end of its movement in the corresponding direction.

20. A device as set forth in claim 17 in which the piston of the remotely located device is provided with a bore therethrough having an enlarged central portion and in which a valve member has a body portion in said central portion of the bore and is formed to abut adjacent the restricted portions at either end of said central portion to form a valve seat, said valve structure being further formed with stems at each end extending beyond both sides of the piston whereby said valve structure is seated by fluid pressure at either side of the piston and is mechanically opened by contact of said stems with the cylinder when the piston of the remote device reaches the end of its stroke before the piston of the tractor mounted device reaches the end of its stroke in the corresponding movement.

21. A hydraulic power attachment for tractors comprising in combination a pump adapted to be driven from the power plant of the tractor, a cylinder and piston device mounted on the tractor, a fluid reservoir and associated valve means mounted on the tractor, fluid conducting means connecting the pump, reservoir and valve means, a conduit means connecting said valve means and one end of the cylinder to provide for flow of fluid under pressure to the cylinder and for return flow from the cylinder, manual control means for said valve means, a second remotely located two-way acting cylinder and piston device, a conduit connected to one end of said second cylinder and adapted to be put into communication with the other end of the first named cylinder, the connected ends of said cylinders having the same displacement capacity, the working phase relationship being such that one cylinder at said connected ends is full at that end when the other cylinder is empty at said connected end, a conduit connected to the other end of the second cylinder and adapted to be put into communication with the valve means, and means for removing said second cylinder from operation including means for conducting fluid from the other end of the first named cylinder directly to the valve means independent of the second named cylinder.

22. A device as set forth in claim 21 in which said second named cylinder is provided with synchronizing means including valve means automatically opened at the end of the piston stroke in either direction whereby said cylinder can be connected to the first named cylinder for operation therewith in any phase relationship and is thereafter brought into synchronized phase relationship by operating the first named piston to its extreme position in both directions.

23. A hydraulic power attachment for tractors comprising in combination a pump adapted to be driven from the power plant of the tractor, an implement actuating rock-shaft mounted on the tractor, a cylinder and piston device mounted on the tractor and connected to said rockshaft for oscillation thereof, a fluid reservoir and associated valve means mounted on the tractor, fluid conducting means connecting the pump, reservoir and valve means, a conduit means connecting said valve means and one end of the cylinder to provide for flow of fluid under pressure to the cylinder and for return flow from the cylinder, manual control means for said valve means, mechanically operated motion transmitting means connected to move with said piston operable to return the valve means to neutral position and thereby stop movement of the piston when the piston has reached a predetermined position, a second remotely located two-way acting cylinder and piston device, a conduit connected to one end of said second cylinder and adapted to be put into communication with the other end of the first named cylinder, the connected ends of said cylinders having the same displacement capacity whereby the contents of one cylinder at said connected ends upon a complete discharge stroke thereof completely fills the other cylinder at its connected end and completes a stroke thereof in the reverse direction, a conduit connected to the other end of said second cylinder and adapted to be put into communication with the valve means, said valve means having a neutral position in which fluid is locked in said conduits and said cylinders and being arranged and constructed when manually shifted to one position to deliver fluid under pressure to one end of the first named cylinder and when shifted in the opposite direction to deliver fluid under pressure to the other end of the second named cylinder, and means providing for removing the second cylinder from operation including means for conducting fluid from the other end of the first cylinder directly to the valve means.

24. A device as set forth in claim 23 in which said second named cylinder is provided with synchronizing means including means to bypass fluid flow around the piston at the extreme end of the movement of the piston in either direction of movement.

25. A hydraulic power attachment for tractors having a power plant comprising a pump attached to be driven from the power plant, a two-way acting cylinder and piston device adapted to be mounted on the tractor, valve means, fluid conducting means connecting said pump and said valve means, a conduit connecting said valve means and one end of the cylinder to provide for flow of fluid under pressure to the cylinder, a second remotely located cylinder and piston device, a second conduit connected to the other end of said first named cylinder and to one end of said second named cylinder, a third conduit connected to the other end of said second named cylinder and to the valve means, and means to cut off communication of the second and third conduits with the second named cylinder and to provide a communication directly between the second conduit and the third conduit whereby the tractor mounted cylinder and piston device is operable independently of the remotely located cylinder and piston device.

26. A hydraulic power attachment for tractors having a power plant comprising a pump attached to be driven from the power plant of the tractor, a two-way acting cylinder and piston device adapted to be mounted on the tractor, valve means, fluid conducting means connecting said pump and said valve means, a conduit connecting said valve means and one end of the cylinder to provide for flow of fluid under pressure to the cylinder and for drainage from the cylinder, a second remotely located two-way acting cylinder and piston device, a second conduit connected to the other end of the first named cylinder and to one end of said second named cylinder, a third conduit connected to the other end of the second named cylinder and to the valve means, an implement having an adjustable element thereon adapted to be flexibly connected to the tractor, said second cylinder and piston device being mounted on said implement and connected to said adjustable element.

27. A hydraulic power attachment for tractors having a power plant comprising a pump attached to be driven from the power plant of the tractor, a two-way acting cylinder and piston device adapted to be mounted on the tractor, valve means, fluid conducting means connecting said pump and said valve means, a conduit connecting said valve means and one end of the cylinder to provide for flow of fluid under pressure to the cylinder and for drainage from the cylinder, a second remotely located two-way acting cylinder and piston device, a second conduit connected to the other end of the first named cylinder and to one end of the second named cylinder, a third conduit connected to the other end of the second named cylinder and to the valve means, and a rockshaft adapted to be mounted on the tractor, the piston of said first named cylinder and piston device being operably connected to said rockshaft.

28. A hydraulic power attachment for tractors having a power plant comprising a pump attached to be driven from the power plant of the tractor, a two-way acting cylinder and piston device adapted to be mounted on the tractor, valve means, fluid conducting means connecting said pump and said valve means, a conduit connecting said valve means and one end of the cylinder to provide for flow of fluid under pressure to the cylinder and for drainage from the cylinder, a second remotely located two-way acting cylinder and piston device, a second conduit connected to the other end of the first named cylinder and to one end of said second named cylinder, a third conduit connected to the other end of the second named cylinder and to the valve means, and means for cutting out the remotely located cylinder and for providing a communication between the second conduit means and the third conduit means.

29. A hydraulic power attachment for tractors having a power plant comprising a pump attached to be driven from the power plant of the tractor, a two-way acting cylinder and piston device adapted to be mounted on the tractor, valve means, fluid conducting means connecting said pump and said valve means, a conduit connecting said valve means and one end of the cylinder to provide for flow of fluid under pressure to the cylinder and for drainage from the cylinder, a second remotely located cylinder and piston device, a second conduit connected to the other end of the first named cylinder and to one end of the second named cylinder, a third conduit connected to the other end of the second named cylinder and to the valve means, and means for putting the second conduit in communication with the third conduit at the end of the stroke of the remote piston whereby the piston in the second named cylinder may be synchronized with respect to the piston in the first named cylinder.

30. A hydraulic power attachment for tractors having a power plant comprising a pump attached to be driven from the power plant of the tractor, a two-way acting cylinder and piston device adapted to be mounted on the tractor, valve means, fluid conducting means connecting said pump and said valve means, a conduit connecting said valve means and one end of the cylinder to provide for flow of fluid under pressure to the cylinder and for drainage from the cylinder, a second remotely located two-way acting cylinder and piston device, a second conduit connected to the other end of the first named cylinder and to one end of the second named cylinder, a third conduit connected to the other end of the second named cylinder and to the valve means, the piston of the remotely located device being provided with valve structure including means projecting beyond each side of the piston engageable with the ends of the cylinder to mechanically open said valve structure for the flow of fluid through the piston for synchronization of the pistons when the remote piston reaches the end of its stroke in either direction before the piston of the tractor mounted device reaches the end of its stroke in the opposite direction.

31. A hydraulic power attachment for tractors having a power plant comprising a pump adapted to be driven from the power plant, a two-way acting cylinder and piston device adapted to be mounted on the tractor, valve means, fluid conducting means connecting said pump and said valve means, a conduit connecting said valve means and one end of the cylinder, a second remotely located cylinder and piston device, a second conduit connected to the other end of said first named cylinder and to one end of said second named cylinder, a third conduit connected to the other end of said second named cylinder and to the valve means, and means to provide a communication directly between the second conduit and the third conduit whereby the tractor mounted cylinder and piston device is operable independently of the remotely located cylinder and piston device, said means for putting the second conduit in communication with the third conduit including valve means operable by movement of the remote piston at the end of its stroke in either direction to automatically bring about phasing of the two pistons.

RUSSEL D. ACTON.

(References on following page)

References Cited in the file of this patent

UNITED STATES PATENTS

| Number | Name | Date |
|---|---|---|
| 2,072,111 | Keeler | Mar. 2, 1937 |
| 2,160,596 | Lebleu | May 30, 1939 |
| 2,276,979 | Jacobi | Mar. 17, 1942 |
| 2,292,961 | Mott | Aug. 11, 1942 |
| 2,346,857 | Meredith | Apr. 18, 1944 |
| 2,354,274 | Orelind | July 25, 1944 |
| 2,361,326 | Silver | Oct. 24, 1944 |
| 2,368,125 | Evans | Jan. 30, 1945 |
| 2,368,659 | Heineck et al. | Feb. 6, 1945 |
| 2,386,378 | Wippel | Oct. 9, 1945 |
| 2,409,510 | Mott | Oct. 15, 1946 |
| 2,410,918 | Acton | Nov. 12, 1946 |
| 2,436,155 | Silver | Feb. 17, 1948 |
| 2,485,651 | Oerman | Oct. 25, 1949 |